Nov. 16, 1954  E. A. NEWMAN ET AL  2,694,521
BINARY ADDER
Filed Dec. 18, 1950                                2 Sheets-Sheet 1
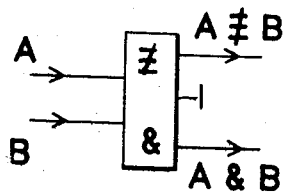
FIG. 1
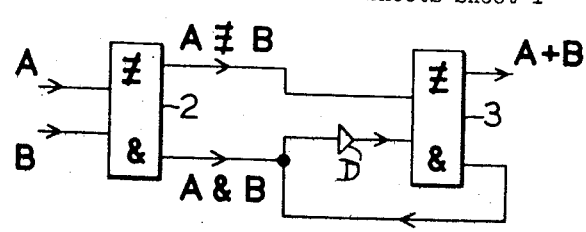
FIG. 2
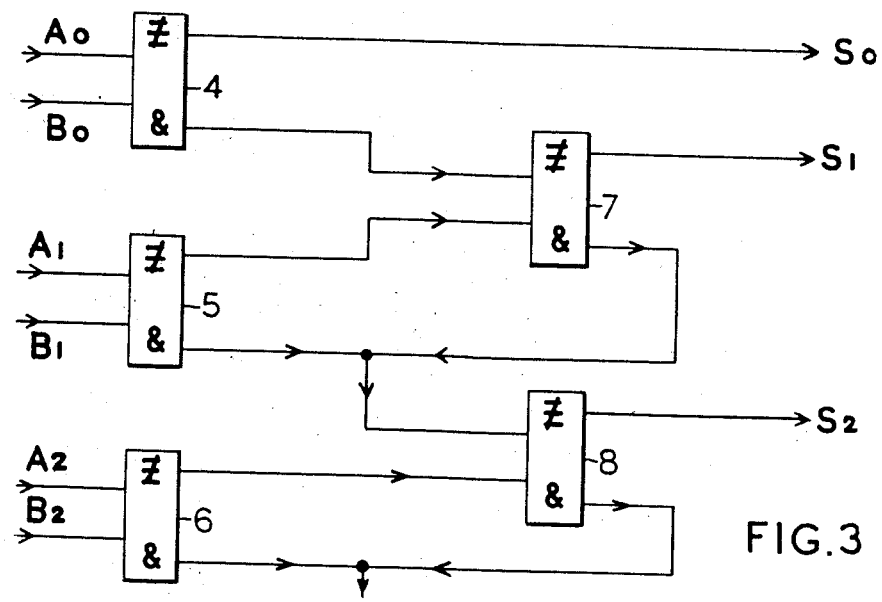
FIG. 3
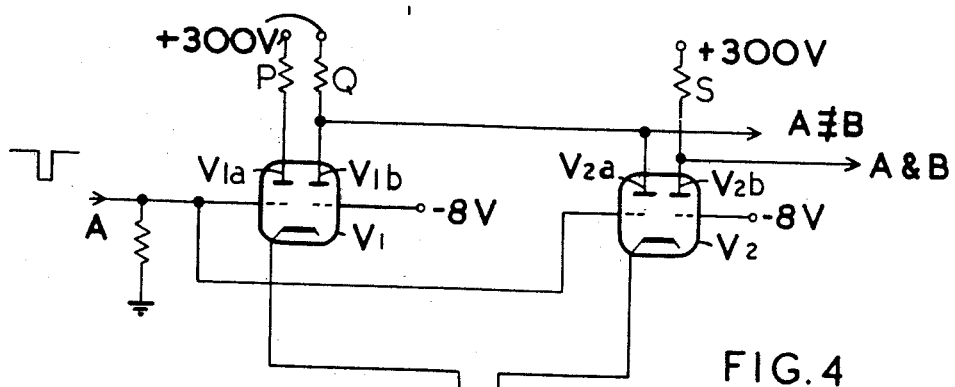
FIG. 4
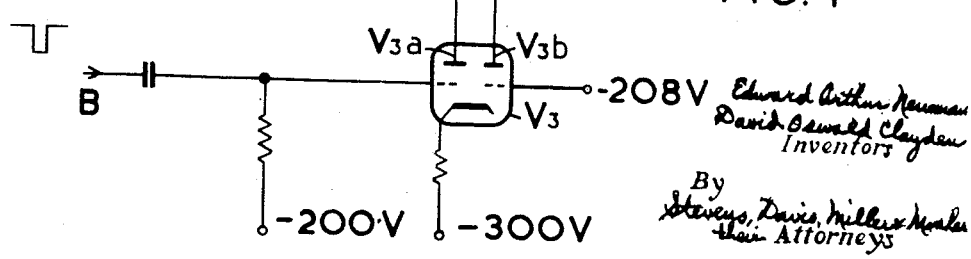
Edward Arthur Newman
David Oswald Clayden
Inventors
By
Stevens, Davis, Miller & Mosher
their Attorneys Nov. 16, 1954     E. A. NEWMAN ET AL     2,694,521
BINARY ADDER
Filed Dec. 18, 1950     2 Sheets-Sheet 2
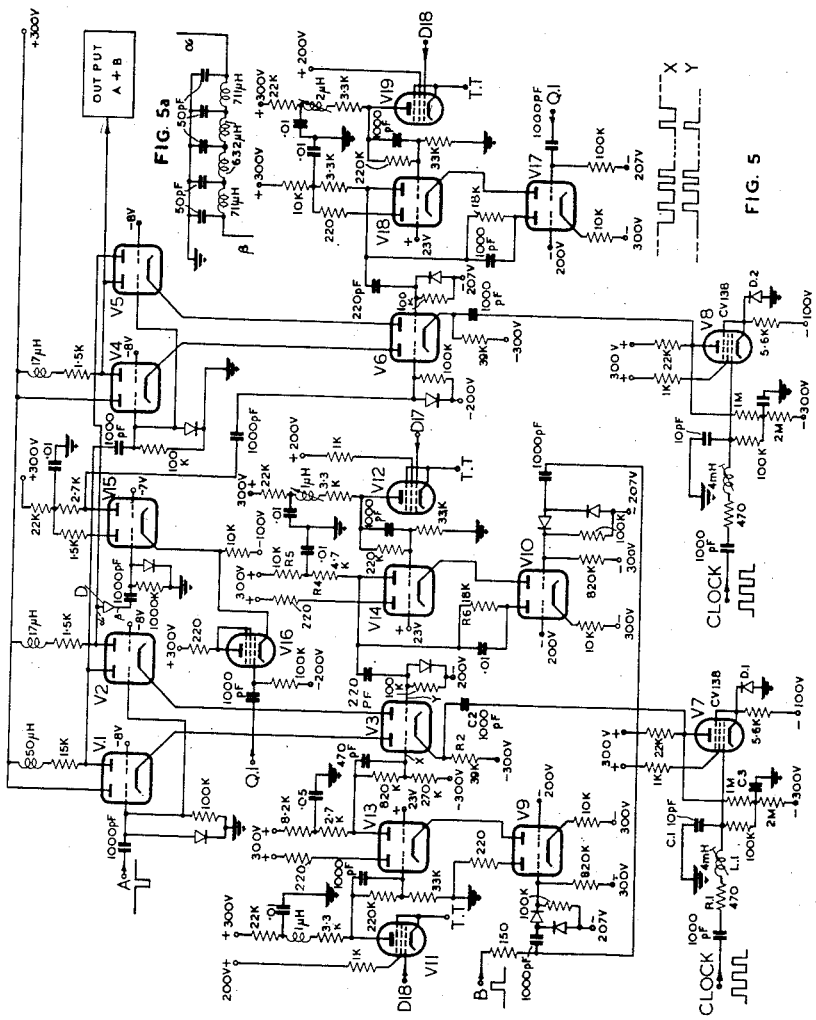
EDWARD A. NEWMAN
DAVID O. CLAYDEN
*Inventors*
By *Stevens, Davis,
Miller & Mosher*
*Attorneys*

United States Patent Office 2,694,521
Patented Nov. 16, 1954

2,694,521

BINARY ADDER

Edward Arthur Newman, Teddington, and David Oswald Clayden, London, England, assignors to National Research Development Corporation, London, England, a British corporation Application December 18, 1950, Serial No. 201,286

Claims priority, application Great Britain December 22, 1949

11 Claims. (Cl. 235—61)

This invention relates to electronic digital computing engines in which electrical pulse patterns representing numbers in the binary scale of notation are used. In particular the invention relates to half adders for use in such engines.

The half adder is a circuit for yielding from two pulse inputs A and B, two outputs, namely "A≠B" and "A & B," that is to say an outpult pulse on the not-equivalent output line when A is 1 (represented by a pulse) and B is 0 (represented by the absence of a pulse), or vice versa, but no output when A and B are both 1 or 0; and an output pulse on the & output line when A and B are both 1 but not otherwise.

Half adders may be combined to form adders for use in computing engines working in the serial mode or in the parallel mode. Half adders are also used in certain counting circuits.

The present invention employs changeover gates, that is to say, circuits in which a predetermined potential or state of conductance may be switched from one line to another by the incidence of a pulse.

According to the present invention there is provided a half adder comprising a first, a second and a third changeover gate, the said third changeover gate being arranged to be controlled by one input to the half adder and connected to render, according to its state, said first or said second changeover gate operative, the said first and second changeover gates both being arranged to be controlled by the other input to the half adder, the not-equivalent output from the half adder being arranged to be taken from two interconnected outputs of the said first and second gates and the & output of the half adder from one output of the said first or second gate.

In a preferred embodiment of the invention the said changeover gates each comprise two thermionic valves having a common cathode load and arranged so that, provided the input potentials of the two valves differ by more than a predetermined value, only one valve conducts. The two valves may be in the same envelope and have a common cathode structure. A double triode valve such as Mullard ECC 91 may be used.

According to a feature of the invention pulses may be applied to the said third changeover gate to render it, and hence the whole half adder, operative only during the digit periods of a computing engine in which the half adder is used.

Reference is now made to the accompanying drawings in which:

Figure 1 illustrates diagrammatically a half adder;

Figure 2 illustrates a combination of two half adders to form an adder for use in a digital computing engine operating in the serial mode;

Figure 3 illustrates the combination of a number of half adders to form an adder for use in a digital computing engine operating in the parallel mode;

Figure 4 illustrates the basic circuit of a half adder according to the present invention;

Figure 5 illustrates a serial adder of the kind shown in Figure 2 and using half adders according to the present invention. Figure 5a is a detail of Figure 5.

Figure 1 shows a half adder 1 to which are applied pulses representing digits A and B. This half adder has two output lines yielding output pulses A≠B and A & B, the output A≠B may be considered as the sum of the digits A and B and the output A & B as a carry digit.

Two half adders of this kind can be combined to form a serial adder as shown in Figure 2. In this case the A≠B output from the first half adder 2 is applied directly to the second half adder 3 and the A & B output from the first half adder 2 is applied through a unit delay D as the other input to the second half adder 3. The & output from the second half adder 3 is also applied through the unit delay D as an input to the second half adder 3 and the not-equivalent output from the second half adder 3 represents the required sum A+B. The unit delay D of course introduces a time delay equal to the interdigit time of the computing engine.

This serial adder will be familiar to those skilled in these matters and operates as follows:

If $A=B=0$ there is no output from the first half adder. If $A=1$ and $B=0$ (or $A=0$ and $B=1$) there is an output pulse from the not-equivalent part of the first half adder but not from the & part. If $A=B=1$ there is an output from the & part of the first half adder but not from the not-equivalent part. Thus, at the first entry if $A=1$ and $B=0$, or vice versa, there will be an output pulse at the output A+B and no carry digit will enter the delay D. If $A=0$ and $B=0$ there will be no output at the output marked A+B and again no carry digit will enter the delay D. Finally, if $A=1$ and $B=1$ there will be no output at the output mark A+B but a carry digit will enter the delay unit D.

On the second entry the second half adder will operate in a way depending on whether a carry digit has or has not entered the delay D in the first entry. If a carry digit has not entered in the delay D the second half adder will operate in the manner described above. If a carry digit has entered the delay D in the first entry it will on the second entry enter the second half adder with the output, if any, from the not-equivalent part of the first half adder. Thus, if in the second entry $A=1$ and $B=0$, or vice versa, the previous carry digit will combine with the not-equivalent output of the first adder and will yield an 0 at the A+B output and a further carry digit at the & output of the second half adder which will enter the delay D and appear as a carry digit at the third entry. Of course, if $A=B=0$ at the second entry the carry digit from the first entry will enter the second half adder alone and yield a 1 at the A+B output and no further carry digit. Similarly, if $A=B=1$ at the second entry the 1 derived from the carry digit will appear at the output A+B and a new carry digit from the & output of the first half adder will enter the delay D to become operative at the third entry. This process repeats until the required sum is obtained.

Half adders may also be combined to form an adder operating in the parallel mode. This may be done as shown in Figure 3 in which the digits A0, A1, A2, etc., of one number and the digits B0, B1, B2, etc. of a second number are applied simultaneously to the half adders, 4, 5, 6, etc. The digits A0 and B0 are the digits of least significance. The not-equivalent output from the half adder 4 provides the least significant digit S0 of the required sum. The & output, if any, of the half adder 4 is the carry digit of next significance. This is combined with the not-equivalent output from the half adder 5 in the half adder 7 the not-equivalent output of which provides S1 the next significant digit of the required sum and the & output of which provides the next significant carry digit, if any. The next carry digit can also be supplied by the & output of the half adder 5. This next carry digit, coming either from 7 or 5, is combined in a similar way with the not-equivalent output from the half adder 6 in a half adder 8 and so on, sufficient half adders being provided to deal with all the digits in the numbers. These adders and other uses of half adders are described in chapter 8 of Calculating Instruments and Machines by Douglas R. Hartree published by the University of Illinois Press, 1949.

The basic circuit of a half adder according to a preferred embodiment of invention is shown in Figure 4 of the accompanying drawings. This comprises a double-triode valve V3 having a common cathode resistance connected to a point at a low potential, say minus 300 volts. One triode V3b of the valve V3 has its control grid biased to a low value say minus 208 volts, the other triode V3a of the valve V3 has its control grid biased at a higher potential, say minus 200 volts, so that it is normally conducting. A second double-triode valve V1 has for its cathode load, the triode V3a, and the triode V1b of the valve V1 has its control grid biased to a low value, say minus 8 volts, so that normally the triode V1a of the valve V1, which is biased to zero volts, is conducting. The anodes of the triode V1a and V1b are connected through loads P and Q respectively to a point at high potential say plus 300 volts.

A further double triode valve V2 has for its cathode load the triode V3b and of this valve V2 the control grid of the triode V2b is biased to a low potential, say minus 8 volts, while the control grid of the triode V2a is biased to zero volts so that when the triode V3b is conducting and no input is applied to the valve V2, the triode V2a is conducting. The anode of the triode V2a is connected to the anode of the triode V1b and is the not-equivalent output of the half adder. The anode of the triode V2b is connected through a resistance S to a point of high potential say plus 300 volts and is the & output of the half adder. The control grids of the triodes V1a and V2a are connected together and are fed with pulses representing the digits of the number A, while the control grid of the triode V3a is fed with pulses representing digits of the number B.

The pulses represent 1's in the numbers A and B and are negative going. The half adder operates as follows:

If $B=0$ the triode V3a, and hence one of the triodes in V1, is conducting. If $B=1$ the control grid of the valve V3a goes so negative relative to the grid of the valve V3b that the state of conducting is transferred to the triode V3b and hence to one of the triodes in V2. If $A=0$ the triode V1a or V2a (according to which part of the valve V3 is conducting) is conducting. When $A=1$ the control grids of the triodes V1a and V2a are driven so far negative that the state of conducting is transferred to the triode V1b or V2b. Hence the state of conducting of the valves V1a, V1b, V2a and V2b may be represented by the following scheme:

| A | B | Only Conducting Valve of V1a, V1b, V2a and V2b |
|---|---|---|
| 0 | 0 | V1a |
| 1 | 0 | V1b |
| 0 | 1 | V2a |
| 1 | 1 | V2b |

Hence the incidence of a 1 at A or B alone results in a negative pulse at the interconnected anodes of V1b or V2a which form the not-equivalent output, whereas the incidence of a 1 at both A and B results in a negative pulse at the anode of V2b which is the & output. When $A=B=0$ there is no change at either output.

Figure 5 of the accompanying drawings shows a practical circuit of a serial adder of the kind illustrated in Figure 2 and employing half adders of the kind illustrated in Figure 4. The two half adders comprise the valves V1, V2, V3 and V4, V5, V6 respectively, the unit delay between the two half adders is at D. Other parts of the circuit perform various functions which will now be described. The A pulses are applied as negative going pulses to the valves V1 and V2. The B pulses are applied in the manner described below. The A pulses are applied to the valves V1 and V2 through a capacitor and the usual direct-current restoring diode is provided as shown in the drawing. Similar restoring diodes are provided at the pulse inputs of the valves V3, V4, V5, V6, V9, V10, V15. At the B pulse inputs of the valves V9 and V10 there are also provided series diodes. These slightly delay the fall of the back edge of the B pulses and thus slightly extend the effective width of the pulses and make the operation of the adder more reliable.

The half adder in Figure 4 was described on the assumption that the A and B pulses were exactly contemporaneous and in practice, owing to various small delays and pulse distortions introduced in the circuits of a computing engine, pulses occurring at various points may show slight differences in width and timing. For this reason it is usual at various points to gate pulses with a series of pulses of good shape occurring at the digital frequency of the engine. These pulses are usually referred to as clock pulses. In the present circuit clock pulses are applied to the cathode of the valve V3 via a pentode-diode gate comprising the valve V7 and the diode (thermionic or crystal) D1 so that the first half adder can become operative only during the incidence of the clock pulses. In the practical embodiment illustrated the clock pulses were positive-going pulses of 15 volts amplitude occurring once every microsecond and were 0.3 microsecond wide. These clock pulses will pass through a circuit comprising the resistance R1, the adjustable self inductance L1 and the capacity C1 which acts as a filter and phase shifter so that in effect sine waves are applied to the control grid of the valve V7. The components C1 and L1 are adjusted so that the timing of these sine waves is suitable for gating the A and B pulses. The pulses applied to the valve V7 cause the state of conductance of the valves V7 and D1 to interchange and the result is that negative-going pulses of the required time are generated at the anode of the valve V7 and are applied to the cathode of the valve V3 to render the first half adder operative during the required periods. Pulses from the anode of the valve V7 are also applied to an integrating circuit comprising the condenser C3, which automatically adjusts the bias on the valve V7 to maintain the pulses at a constant width. This part of the circuit constitutes a separate invention which is described in British Patent No. 698,950.

Providing that suitable values of components are chosen, current will be pulsed in the cathode of the double triode valve V3 as follows:

The mean value of the current through the double triode V3 is controlled by its cathode resistor R2: but while the pentode V7 is cut off, this cathode current will charge up C2, very little current going through the double triode V3. At the occurrence of clock pulses, the potential of the other side of C2 will be lowered, thus (1) discharging C2 into the double-triode V3 cathode, and (2) directing the steady current from the cathode resistor R2 also into the valve, V3, during the time of the clock pulse. In the equilibrium condition the current delivered to the valve V3 during the pulses depends on the mean value of the cathode current and duty cycle of the pulses. The cathode potential of V3 will rise during the non-conducting periods until the equilibrium condition is obtained. Hence the value of R2 is adjusted to give the required resting level for the cathode potential of V3.

Similar clock pulses are applied to the cathode of the valve V6 via a pentode-diode gate comprising the valve V8 and the diode D2 arranged to operate in the same way as the pentode-diode gate V7, D1.

The circuit of Figure 5 has been described as an adder but, as is usual in these machines, it can also perform the operation of subtraction. This is done as follows:

To obtain A—B the number B is negated (that is to say pulses in B are replaced by spaces and vice versa), the negated B and 1 is added to A and the last carry digit is suppressed. This process is well known to those dealing with these engines and may be illustrated as follows:

Suppose
$A=23$ that is in binary notation 10111
and
$B=13$ that is in binary notation 01101 then the difference 10 that is in binary notation 01010 is obtained as follows:

A _____ 10111
Not B _____ 10010
                                          1

Add and suppress round carry digit _____ (1)01010

Suppose the adder deals with numbers up to 32 digits occurring in periods represented by P1 to P32 then the last carry digit to be suppressed will occur at P33 ($=$P1 of the next number). Subtraction is, therefore, effected by negating the B input and simultaneously adding a P1 digit to the adder output and suppressing the round carry digit occurring at the next P1 period.

In the adder described by way of example with reference to Figure 4, carry digits may occur at any time so that where it is required to use the adder with separate words (numbers or instructions) that occur consecutively it is possible that a carry pulse may be generated in the last digit period and be passed through the delay D to occur at P1, i. e. the beginning of the next word; thus increasing the next word by one. For this reason no digits should be allowed to pass into the output which occurs at P1 time out of the delay D.

This end is achieved by a circuit arranged between the left hand grid of the valve V6 and the delay D. This extra circuit comprises a double-triode gate V15 and a pentode valve V16 which have a common cathode connection which is connected through a load to a point of low potential so that current flows to the anode whose corresponding control grid has the highest potential. Normally, this will be one of the double-triode grids and pulses from the delay D will be passed on to V6 through the double triode V15, but a wide positive pulse is applied at Q1 during the P1 periods to the control grid of the valve V16 of sufficient amplitude to cause this valve to conduct during the P1 periods, and this cuts off the double-triode gate V15 during these periods. The pulses P1, P2 ... etc. are derived from a ring counter such as is described in Hartree's "Calculating Instruments and Machines" at page 102 (University of Illinois Press, 1949) or in copending U. S. application Ser. No. 202,615, filed December 26, 1950, by James H. Wilkinson. The ring counter may generate wide pulses, which are usually designated by Q1, Q2, ... etc. These wide pulses may be gated by narrow clock pulses (which are generated by any convenient periodic pulse generator, e. g. a multivibrator) to yield the narrow digit pulses P1, P2 ... etc.

The circuit is arranged so that the B digits are not applied directly to the valve V3 but are applied to an external circuit which enables either of the control grids of the valve V3 to be fed with signals. In addition in this circuit the bias conditions are reversed in valve V3 as compared with the valve V3 in Figure 4 and the B pulses are applied as positive going pulses.

In this case the B input is applied simultaneously to the two double-triode gates V9 and V10 and the engine is designed so that the pentode V11 or V12 is arranged to conduct by biases applied to either D18 or D17. When D17 is biased to cause the valve V12 to conduct, the normal additive B input is applied to the right-hand grid of the valve V3.

Between the valve V3 and the valves V9 and V10 there are arranged triode gates V13 and V14 respectively and these gates are opened by the pentode valves V11 and V12 respectively. Thus when the valve V12 is switched on, the state of conduction in the valve V14 passes to the left-hand anode and the B pulses are applied as positive pulses to the right-hand control grid of V3, because current which was previously always flowing in the load R4, R5 (via the left-hand side of V10 and the resistance R6 or the right-hand side of V10 and the right-hand side of V14) is now switched by the B pulses to the left-hand anode of V14. The total effect is that when B pulses are applied to the right-hand grid of V3 they form an additive input.

The subtractive input is fed in to the left-hand grid of V3 and the circuit is arranged so that when the pentode valve V11 is off, the left-hand grid of the valve V3 remains sufficiently high to make the left-hand side of the valve V3 conduct but when the pentode V11 is switched on by a voltage at D18 the resting level of the left-hand grid of V3 drops (to about −223 volts) and the effect in the absence of a B input is the same as continuous input of "ones" on the right-hand grid of V3. When, however, there is a signal on the B input the cathode current of the gate V13 will be switched off during the time of occurring of each digit in the input and during these times the signal on the left-hand grid of V3 will rise to its normal value and, therefore, be equivalent to a 0 digit signal on the right-hand grid of V3. Hence the input will have the effect of the complement of the B number.

The nature of the signals applied at X and Y to the valve V3 are shown at X and Y at the side of the drawing.

When the substractive B input is used it is necessary to add a 1 in the P1 period and this may conveniently be done at the right-hand grid of valve V6 since at this point, owing to round carry suppression, normally no P1 digit will occur. The P1 digit is added by applying a wide pulse Q1 in the period P1 to the double-triode gate V17 which is applied to the right-hand grid of V6 via the gate V18 when the pentode valve V19 is caused to conduct by the pulse D18 applied to its control grid. This is the same pulse as is applied to the valve V11 so that the addition of 1 in the P1 period automatically takes place when subtraction is being done. It will be seen that the circuit arranged for injecting this 1 into the valve V6 is similar to that used for injecting the additive B input into the right-hand grid of the valve V3. The double triode valves in this circuit may be Mullard ECC 91 and the pentodes may be M. V. O. 277 (CV. 138).

Figure 5a shows the details of the unit delay D in Figure 5. This has only four sections and is not a very good delay line and probably distorts the digit pulses considerably but because the valve V6 is gated with clock pulses this distortion is unimportant.

The positive biases applied to D17 or D18 to produce addition or subtraction respectively will, of course, be applied during the whole of the addition or subtraction process. These biases will be delivered by the control system in the computing engine and in general will be staticised from code digits in the instruction word which orders the addition (or subtraction) so that positive bias cannot be applied to D17 and D18 simultaneously.

The method of staticising an instruction digit will be well known to those skilled in the present art. A trigger circuit arranged to be set by the appropriate digit in the instruction word may be connected to bias the terminals marked D17 and D18 by its two inverse outputs respectively. Thus if the instruction word puts the trigger on, the terminals D18 may go positive (and D17, of course, negative) and the adder will subtract; conversely if the instruction word does not put the trigger on, the terminals D17 will go positive (D18, being connected to the other output terminal of the trigger, will go negative) so that the adder will add.

The use of an instruction staticiser is illustrated in Fig. 63 of Professor Hartree's book mentioned above.

Owing to the action of the clock-pulse valves V7 and V8 the adder valves V1, V2, V3, V4, V5 and V6 can conduct only during the clock pulse on periods. The states of conducting during these periods, of these valves for various entries of A and B digits is set out in the scheme below; both for addition and subtraction. In this scheme R or L means that the hight-hand or left-hand side of the valve shown in Fig. 5 is conducting. A space means that neither side of the valve is conducting. The output is a 1 (a negative pulse) when either the right-hand side of V4 or the left-hand side of V5 conducts.

| Input | Conducting path in— | | | | | | Output |
|---|---|---|---|---|---|---|---|
| | V1 | V2 | V3 | V4 | V5 | V6 | |
| | Addition | | | | | | |
| No input | L | | L | L | | L | 0 |
| A=1 B=0 1st entry | R | | L | R | | L | 1 |
| A=1 B=0 2nd entry | R | | L | R | | L | 1 |
| A=1 B=1 1st entry | | R | R | L | | L | 0 |
| A=1 B=0 2nd entry | R | | L | | R | R | 0 |
| A=0 B=0 3rd entry | L | | L | | L | R | 1 |
| | Subtraction | | | | | | |
| No input | | L | R | L | | L | 0 |
| A=1 B=0 1st entry | | R | R | | L | R | 1 |
| A=1 B=0 2nd entry | | R | R | | L | R | 1 |
| A=1 B=1 1st entry | R | | L | | R | R | 0 |
| A=1 B=0 2nd entry | | R | R | | L | R | 1 |

This scheme may easily be verified but in those cases in which the conducting path in V6 is changed to the right-hand side the following explanation may be useful.

The valve V6 normally conducts on its left-hand side but this is changed when a carry has arisen in the previous entry. As a special case it also changes at the first entry in subtraction due to the Q1 pulse applied via the valve V17. Carry digits can arise in three ways, viz:

(1) Due to two ones at the input
(2) Due to a one at the input and a previous carry, and
(3) Due to two ones at the input and a previous carry In cases (1) and (3), V6 is changed by a delayed negative pulse arising from conduction in the right-hand path of V2 and in case (2) V6 is changed by a delayed negative pulse arising from conduction in the right-hand path of V5.

As used in the claims, "right hand" and "left hand" have no connotation of structural limitation nor of positional or spatial significance in a limiting sense, but are employed solely descriptively in the interest of clarity and definiteness of identification of parts recited in the claims, and to avoid confusing multiple uses of ordinal numbers.

What we claim is:

1. A half adder comprising a first, a second and a third changeover gate, each gate having two conductive paths, the said third changeover gate being arranged to be controlled by one input to the half adder and having its two conducting paths connected separately in series with said first and second changeover gates so as to render, according to its state, said first or said second changeover gate operative, the said first and second changeover gates both being arranged to be controlled by the other input to the half adder, the not-equivalent output from the half adder being arranged to be taken from two interconnected outputs of the said first and second gates and the & output of the half adder from one output of the said first gate.

2. A half adder according to claim 1 and in which the said changeover gates each comprise two thermionic valves having a common cathode connection and arranged so that, provided the input potentials to the said two valves differ by more than a predetermined value, only one valve is in a conducting state.

3. A half adder according to claim 2 and in which each changeover gate comprises a double triode valve in a single envelope.

4. A half adder according to claim 1 including means to apply clock pulses to the said third changeover gate to condition the said third gate to be operative only during the incidence of clock pulses.

5. A half adder according to claim 4 and in which the said third changeover gate comprises two thermionic valves having a common cathode connection, the said clock pulses being arranged to be applied to the common cathode connection of the said third gate as negative going pulses.

6. An adder comprising a first and a second half adder each having two inputs and each including a first, a second, and a third changeover gate, each gate having two conductive paths, the third changeover gates being connected to be controlled by one input to the respective half adder and each having its two conductive paths connected separately in series with the first and second changeover gates constituting parts of the same half adder therewith so as to condition, according to its state, the first or second changeover gate for operation, the first and second changeover gates of the first half adder being connected to be controlled by the other input to the first half adder, the not-equivalent output from the first half adder being connected to an output of each of the first and second gates of the first half adder and the & output of the first half adder being connected to one output of the second gate thereof, means connecting the not-equivalent output of the first half adder to the said other input of the second half adder, means connecting said & output of the first half adder to the said one input of the second half adder, and means including a unit delay circuit connecting the & output of the second half adder to the said one input of the second half adder.

7. An electronic digital adder comprising two half adders, each half adder including first, second and third changeover gates, each of said gates having two conductive paths between anode and cathode with a common cathode connection, means connecting the common cathode of each first and second gates to a respective anode of the associated third gate; in the first half adder, means to apply a first input signal to the left hand paths in the first and second gates to condition the other path in each to conduct, a common output connected to the right hand path of the first gate and to the left hand path of the second gate, an output including a delay device connected to the right hand path of the second gate, means responsive to a second input signal to condition the right hand path of the third gate to conduct, whereby when a 1 signal is present on only one input the output signal goes over the said common output but if 1 signals are present simultaneously on the two inputs the output signal goes through the delay; in the second half adder, means connecting the common output from the first half adder to the left hand paths in the first and second gates, a common output connected to the right hand path of the first gate and to the left hand path of the second gate, means connecting the right hand path of the second gate to the input of the delay device, means responsive to a negative pulse from the delay to apply a negative pulse to the left hand path in the third gate; and means to apply clock pulses to the third gate in each half adder to condition the third gates for operation at predetermined times.

8. An adder according to claim 6 comprising means for suppressing a digit occurring in the P1 digit period and arising from a digit entering the said delay circuit in the previous digit period.

9. An adder according to claim 6 and in which the input controlling the said third changeover gate is arranged to be effectively negated.

10. An adder according to claim 9 and in which said third changeover gate comprises two valves having a common cathode connection and in which the controlling input to the said third gate is arranged to be applied in the same polarity to the inputs of either of the two valves so that in one case it acts as an additive input and in the other case as a subtractive input.

11. An adder according to claim 9 and in which there is provided means for injecting into the final output of the adder a 1 in the digit position of least significance when the said input operates as a subtractive input.

References Cited in the file of this patent

"Theory and Techniques for Design of Electronic Digital Computers," vol. III, pp. 23.1–23.4, June 30, 1948; Moore School of Electrical Engineering, University of Pennsylvania, Philadelphia, Pa.

"Calculating Instruments and Machines," by D. R. Hartree, The University of Illinois Press; copyright August 15, 1949; pp. 97–106.

"A Functional Description of the Edvac," vol. I, pp. 4.10–4.13; vol. II, Figs. 104.3LC.3, 104.10LB.1, 104.10LA.3; Nov. 1, 1949; Moore School of Electrical Engineering, University of Pennsylvania, Philadelphia, Pennsylvania.

"How an Electronic Brain Works," by E. C. Berkeley and R. A. Jensen, Radio Electronics, June 1951, pp. 38–39.